United States Patent
Lee et al.

(10) Patent No.: US 9,077,402 B2
(45) Date of Patent: Jul. 7, 2015

(54) METHOD FOR FEEDING BACK CODEBOOK-BASED PRECODING MATRIX INFORMATION IN WIRELESS COMMUNICATION SYSTEM AND DEVICE THEREFOR

(71) Applicant: LG ELECTRONICS INC., Seoul (KR)

(72) Inventors: Wookbong Lee, Anyang-si (KR); Jaehoon Chung, Anyang-si (KR); Jinsam Kwak, Anyang-si (KR); Hyunsoo Ko, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/355,553

(22) PCT Filed: Nov. 7, 2012

(86) PCT No.: PCT/KR2012/009321
§ 371 (c)(1),
(2) Date: Apr. 30, 2014

(87) PCT Pub. No.: WO2013/069957
PCT Pub. Date: May 16, 2013

(65) Prior Publication Data
US 2014/0341312 A1  Nov. 20, 2014

Related U.S. Application Data

(60) Provisional application No. 61/556,289, filed on Nov. 7, 2011.

(51) Int. Cl.
*H04B 7/04* (2006.01)
*H04L 1/06* (2006.01)
(Continued)

(52) U.S. Cl.
CPC ............... *H04B 7/0417* (2013.01); *H04L 1/06* (2013.01); *H04B 7/0469* (2013.01);
(Continued)

(58) Field of Classification Search
CPC .......................................................... H04B 1/02
USPC .......................................................... 375/267
See application file for complete search history.

(56) References Cited

U.S. PATENT DOCUMENTS

2012/0003945 A1* 1/2012 Liu et al. .................... 455/115.1

FOREIGN PATENT DOCUMENTS

| KR | 10-2008-0041100 | 5/2008 |
| KR | 10-2008-0076683 | 8/2008 |

(Continued)

OTHER PUBLICATIONS

PCT International Application No. PCT/KR2012/009321, Written Opinion of the International Searching Authority dated Mar. 28, 2013, 22 pages.

*Primary Examiner* — Jaison Joseph
(74) *Attorney, Agent, or Firm* — Lee, Hong, Degerman, Kang & Waimey

(57) ABSTRACT

A method for feeding back codebook-based precoding matrix information by a receiving side includes estimating a channel through a receiving signal received from a transmitting side; selecting first and second precoding matrix indexes for indicating precoding matrices selected in a predefined codebook based upon said estimated channel; and transmitting said selected first and second precoding matrix indexes to said transmitting side, wherein said predefined codebook supports antenna patterns at the receiving side, precoder (W) in the predefined codebook is expressed as a multiplication of two precoding matrices ($W_1$ and $W_2$), $W_1$ is constituted as an oversampled discrete Fourier transform (DFT) matrix by a diagonal matrix, an element which reflects a factor in accordance with an antenna pattern configuration of said receiving side is included, and said first precoding matrix index indicates a precoding matrix selected from $W_1$ and said second precoding matrix index indicates a precoding matrix selected from $W_2$.

16 Claims, 4 Drawing Sheets

(51) Int. Cl.
 H04B 7/06 (2006.01)
 H04L 1/00 (2006.01)
 H04L 25/02 (2006.01)
(52) U.S. Cl.
 CPC ............. *H04B 7/0478* (2013.01); *H04B 7/065* (2013.01); *H04L 1/0028* (2013.01); *H04L 25/0204* (2013.01); *H04B 7/046* (2013.01)

(56) References Cited

FOREIGN PATENT DOCUMENTS

| KR | 10-2009-0117583 | 11/2009 |
| KR | 10-2010-0116555 | 11/2010 |

* cited by examiner (a)

(b)

(c)

METHOD FOR FEEDING BACK CODEBOOK-BASED PRECODING MATRIX INFORMATION IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2012/009321 filed on Nov. 7, 2012, which claims the benefit of U.S. Provisional Application Ser. No. 61/556,289, filed on Nov. 7, 2011, the contents of which are all hereby incorporated by reference herein in their entirety.

TECHNICAL FIELD

The present invention relates to a feedback method and, more specifically, to a method for feeding back codebook-based precoding matrix information in a wireless communication system.

BACKGROUND ART

MIMO (multiple input multiple output) refers to a method for improving transmission/reception data efficiency using a plurality of transmit (Tx) antenna and a plurality of receive (Rx) antennas instead of a single Tx antenna and a single Rx antenna. That is, MIMO is a scheme in which a transmitting side or a receiving side of a wireless communication system improves capacity or enhances performance using multiple antennas. MIMO may be referred to as multi-antenna technology.

To support multi-antenna transmission, a precoding matrix for appropriately distributing transmission information to antenna s according to channel state can be applied. 3GPP LTE ($3^{rd}$ Generation Partnership Project Long Term Evolution) supports a maximum of 4 Tx antennas for downlink transmission and defines a precoding codebook for downlink transmission using the Tx antennas.

In a MIMO based cellular communication environment, data transfer rate can be improved through beamforming between a transmitting side and a receiving side. Whether beamforming is applied is determined based on channel information, a channel estimated through a reference signal at the receiving side is appropriately quantized using a codebook and fed back to the transmitting side.

A description will be given of a spatial channel matrix (or channel matrix) which can be used to generate a codebook. The spatial channel matrix (or channel matrix) can be represented as follows.

$$H(i,k) = \begin{bmatrix} h_{1,1}(i,k) & h_{1,2}(i,k) & \ldots & h_{1,Nt}(i,k) \\ h_{2,1}(i,k) & h_{2,2}(i,k) & \ldots & h_{2,Nt}(i,k) \\ \vdots & \vdots & \ddots & \vdots \\ h_{Nr,1}(i,k) & h_{Nr,2}(i,k) & \ldots & h_{Nr,Nt}(i,k) \end{bmatrix}$$

Here, H(i,k) represents a spatial channel matrix, $N_r$ denotes the number of Rx antennas, $N_t$ denotes the number of Tx antennas, r is an Rx antenna index, t is a Tx antenna index, i represents an OFDM (or SC-FDMA) symbol index and k represents a subcarrier index.

$h_{r,t}(i, k)$ is an element of the channel matrix H(i,k) and represents an r-th channel state and a t-th antenna corresponding to an i-th symbol and k-th subcarrier.

In addition, a spatial channel covariance matrix which can be used in the present invention will now be briefly described. The spatial channel covariance matrix can be represented by R.

$$R = E[H_{i,k}^H H_{i,k}]$$

where H denotes a spatial channel matrix and R denotes a spatial channel covariance matrix. In addition, E[ ] represents the mean, i represents a symbol index and k represents a frequency index.

Singular value decomposition (SVD) is a method for decomposing a rectangular matrix, which is widely used in signal processing and statistics. SVD is to normalize matrix spectrum theory for an arbitrary rectangular matrix. An orthogonal square matrix can be decomposed into diagonal matrices using an eigen value as a basis using spectrum theory. When it is assumed that the channel matrix H is an m×n matrix composed of a plurality of set elements, the matrix H can be represented as a product of three matrices as follows.

$$H_{m \times n} = U_{m \times m} \Sigma_{m \times n} V_{n \times n}^H$$

Here, U and V represent unitary matrices and Σ denotes an m×n matrix including a non-zero singular value. The singular value is $\Sigma = \text{diag}(\sigma_1 \ldots \sigma_r)$, $\sigma_i = \sqrt{\lambda_i}$. Representation as a product of three matrices is referred to as SVD. SVD can handle normal matrices, compared to eigen value decomposition which can decompose only orthogonal square matrices. SVD and eigen value composition are related to each other.

When the matrix H is a positive definite Hermitian matrix, all eigen values of H are non-negative real numbers. Here, singular values and singular vectors of H are equal to eigen values and eigen vectors of H. Eigen value decomposition (EVD) can be represented as follows (here, eigen values may be $$HH^H = (U\Sigma V^H)(U\Sigma V^H)^H = U\Sigma\Sigma^T U^H$$

$$H^H H = (U\Sigma V^H)^H (U\Sigma V^H) = V\Sigma^T \Sigma V$$

DISCLOSURE

Technical Problem

An object of the present invention devised to solve the problem lies in a method for a receiving side to feed back codebook based precoding matrix information in a wireless communication system.

Another object of the present invention is to provide a receiving side device for feeding back codebook based precoding matrix information in a wireless communication system.

The technical problems solved by the present invention are not limited to the above technical problems and those skilled in the art may understand other technical problems from the following description.

Technical Solution

The object of the present invention can be achieved by providing a method for feeding back, by a receiving side, codebook based precoding matrix information in a wireless communication system, the method including: estimating a channel through a signal received from a transmitting side; selecting a first precoding matrix index and a second precoding matrix index indicating precoding matrices selected from a predefined codebook based upon the estimated channel; and transmitting the selected first and second precoding matrix indices to the transmitting side, wherein the predefined codebook supports a plurality of antenna patterns at the receiving side and a precoder W in the codebook is represented by the product of two precoding matrices $W_1$ and $W_2$, wherein $W_1$ is an oversampled discrete Fourier transform (DFT) matrix, is composed of a diagonal matrix and includes an element reflecting a factor according to an antenna pattern configuration of the receiving side, wherein $W_2$ is configured in form of $$W_2 = \frac{1}{\sqrt{2}}\begin{bmatrix} 1 \\ \alpha \end{bmatrix}, \alpha \in \{1, j, -1, -j\} \text{ or}$$

$$W_2 = \frac{1}{\sqrt{2}}\begin{bmatrix} 1 & 1 \\ \beta & -\beta \end{bmatrix}, \beta \in \{1, j\},$$

wherein the first precoding matrix index indicates a precoding matrix selected from $W_1$ and the second precoding matrix index indicates a precoding matrix selected from $W_2$. $W_1$ may be configured as $$W_1 = \begin{bmatrix} \tilde{W}_1(n_1) & 0 \\ 0 & \varphi(n_1)\tilde{W}_1(n_2) \end{bmatrix}$$

wherein $\tilde{W}_1(n)$ is an oversampled DFT matrix and $\phi(n)$ is the factor according to the antenna pattern configuration of the receiving side. The matrix $\tilde{W}_1(n)$ may be represented by $$D_N^a = \frac{1}{\sqrt{N}} e^{j\frac{2\pi \cdot k \cdot n}{N \cdot a}} \text{ and } \varphi(n) = e^{j\frac{2\pi \cdot N \cdot n}{N \cdot a}}$$

wherein k=0, ..., N−1, n=0, ..., N·a−1, N=$N_t$/2, $N_t$ denotes the number of antennas and a denotes an oversampling factor.

The first precoding matrix index and the second precoding matrix index may be selected for different frequency granularities or selected having different time periods and transmitted. The frequency granularity of the first precoding matrix may be wideband and the frequency granularity of the second precoding matrix may be subband.

The frequency granularity of the first precoding matrix may be subband and the frequency granularity of the second precoding matrix may be wideband. The receiving side may be user equipment (UE) and the transmitting side may be an eNB. The selected first precoding matrix index may be transmitted in a long term and the selected second precoding matrix index may be transmitted in a short term. On the contrary, the selected first precoding matrix index may be transmitted in a short term and the selected second precoding matrix index may be transmitted in a long term.

The selecting of the first precoding matrix index and the second precoding matrix index may include: determining a value $n_1$ or $n_2$ by which the state of the channel becomes optimal and selecting the first precoding matrix index corresponding to the determined value $n_1$ or $n_2$ from $W_1$; and determining $\alpha$ or $\beta$ according to transmission rank on the basis of the determined value $n_1$ or $n_2$ and selecting the second precoding matrix index corresponding to the determined $\alpha$ or $\beta$ from $W_2$.

In another aspect of the present invention, provided herein is a receiving side for feeding back codebook based precoding matrix information in a wireless communication system, including: a processor configured to estimate a channel through a signal received from a transmitting side and to select a first precoding matrix index and a second precoding matrix index indicating precoding matrices selected from a predefined codebook on the basis of the estimated channel; and a transmitter configured to transmit the selected first and second precoding matrix indices to the transmitting side, wherein the predefined codebook supports a plurality of antenna patterns at the receiving side and a precoder W in the codebook is represented by the product of two precoding matrices $W_1$ and $W_2$, wherein $W_1$ is an oversampled DFT matrix, is composed of a diagonal matrix and includes an element reflecting a factor according to an antenna pattern configuration of the receiving side, wherein $W_2$ is configured in the form of $$W_2 = \frac{1}{\sqrt{2}}\begin{bmatrix} 1 \\ \alpha \end{bmatrix}, \alpha \in \{1, j, -1, -j\} \text{ or}$$

$$W_2 = \frac{1}{\sqrt{2}}\begin{bmatrix} 1 & 1 \\ \beta & \beta \end{bmatrix}, \beta \in \{1, j\},$$

wherein the first precoding matrix index indicates a precoding matrix selected from $W_1$ and the second precoding matrix index indicates a precoding matrix selected from $W_2$. $W_1$ may be configured as $$W_1 = \begin{bmatrix} \tilde{W}_1(n_1) & 0 \\ 0 & \varphi(n_1)\tilde{W}_1(n_2) \end{bmatrix}$$

wherein $\tilde{W}_1(n)$ is an oversampled DFT matrix and (n) is the factor according to the antenna pattern configuration of the receiving side. The matrix $\tilde{W}_1(n)$ may be represented by $$D_N^a = \frac{1}{\sqrt{N}} e^{j\frac{2\pi \cdot k \cdot n}{N \cdot a}} \text{ and } \varphi(n) = e^{j\frac{2\pi \cdot N \cdot n}{N \cdot a}}$$

wherein k=0, ..., N−1, n=0, ..., N·a−1, N=$N_t$/2, $N_t$ denotes the number of antennas and a denotes an oversampling factor. When the processor selects the first precoding matrix index and the second precoding matrix index, the processor may be configured to determine a value $n_1$ or $n_2$ by which the state of the channel becomes optimal, to select the first precoding matrix index corresponding to the determined value $n_1$ or $n_2$ from $W_1$, to determine $\alpha$ or $\beta$ according to transmission rank on the basis of the determined value $n_1$ or $n_2$ and to select the second precoding matrix index corresponding to the determined $\alpha$ or $\beta$ from $W_2$.

Advantageous Effects

According to embodiments of the present invention, it is possible to provide a method and apparatus for transmitting signals using a codebook capable of efficiently supporting MIMO transmission which supports an extended antenna configuration. Furthermore, it is possible to provide a codebook capable of supporting both co-polarization antenna and cross-polarization antenna configurations.

In addition, it is possible to provide a method and apparatus for transmitting signals using a codebook to reduce feedback overhead while maintaining system performance.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following detailed description is given under the assumption that 3GPP LTE mobile communication systems are used. However, the description is applicable to any other mobile communication system except for specific features inherent to the 3GPP LTE systems.

In some instances, known structures and devices are omitted, or are shown in block diagram form focusing on important features of the structures and devices, so as not to obscure the concept of the present invention. The same reference numbers will be used throughout this specification to refer to the same or like parts.

In the following description, a user equipment (UE) is assumed to refer to a mobile or fixed user end device such as a mobile station (MS), an advanced mobile station (AMS), etc. The term 'base station (BS)' is assumed to refer to any node of a network end, such as a Node B, eNode B, an access point (AP), etc., communicating with a UE. While the following description is based on 3GPP LTE and LTE-A, the present invention is applicable to other communication systems.

In a mobile communication system, a UE may receive information from a BS on a downlink and transmit information to the BS on an uplink. The information that the UE transmits or receives includes data and various types of control information. There are many physical channels according to the types and usages of information that the UE transmits or receives.

A description will be given of 3GPP LTE ($3^{rd}$ Generation Partnership Project Long Term Evolution) (referred to as LTE hereinafter) and LTE-Advanced (referred to as LTE-A hereinafter) systems as exemplary mobile communication systems to which the present invention is applicable.

Figure 1:
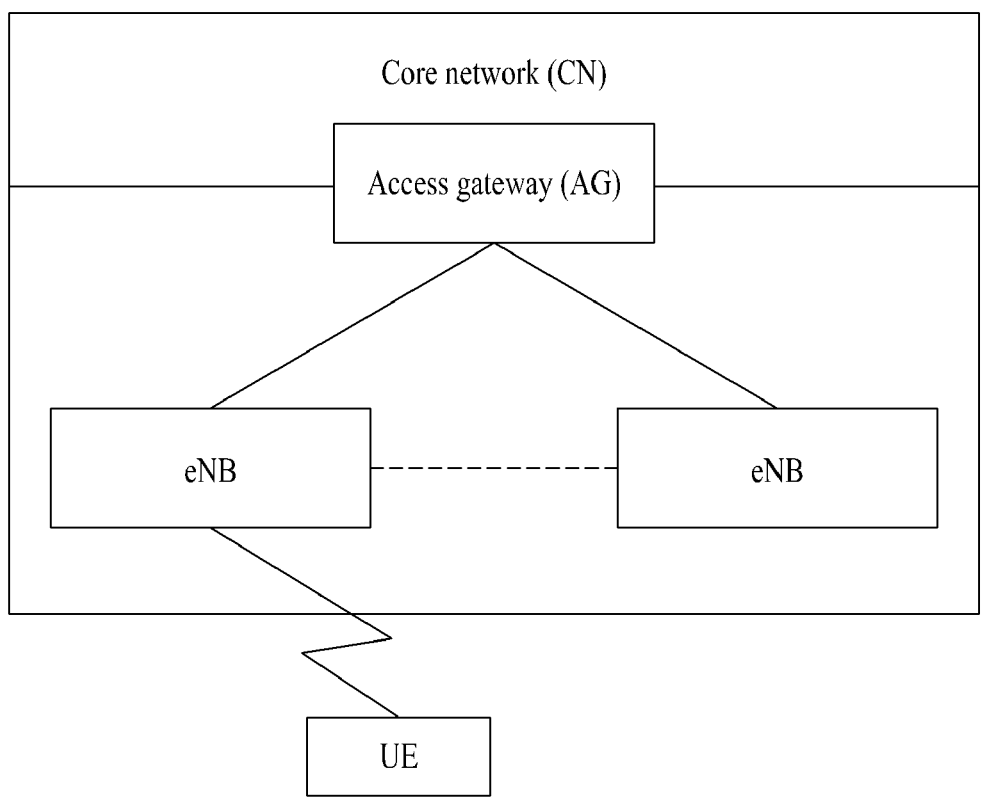
FIG. 1 illustrates E-UMTS network architecture as an exemplary mobile communication system.

FIG. 1 illustrates E-UMTS (Evolved Universal Mobile Telecommunicaiton System) network architecture as an exemplary mobile communication system.

E-UMTS, which evolves from UMTS (Universal Mobile Telecommunication System), is under standardization according to 3GPP. E-UMTS may be regarded as an LTE system. Technical specification of UMTS and E-UMTS refers to Release 7 and Release 8 of "$3^{rd}$ Generation Partnership Project: Technical Specification Group Radio Access Network".

Referring to FIG. 1, E-UMTS includes a user equipment (UE), en eNB and an access gateway (AG) located at the end of a network (E-UTRAN) and connected to an external network. The eNB can simultaneously transmit multiple data streams for broadcast service, multicast service and/or unicast service.

One or more cells are present in one eNB. A cell is set to one of bandwidths of 1.25, 2.5, 5, 10, 15 and 20 MHz and provides downlink or uplink transmission service to multiple UEs. Different cells may be configured to provide different bandwidths. The eNB controls data transmission/reception with respect to a plurality of UEs. The eNB transmits downlink scheduling information about downlink data to a corresponding UE to inform the UE of a time/frequency region used to transmit the data, coding information, data size, hybrid automatic repeat and request (HARQ) related information, etc.

In addition, the eNB transmits uplink scheduling information about uplink data to a corresponding UE to notify the UE of a time/frequency region that can be used by the UE, coding information, data size, HARQ related information, etc. An interface for user traffic or control traffic transmission may be used between eNBs. A core network (CN) may be composed of the AG and a network node for user registration of the UE. The AG manages UE mobility per TA (tracking area) including a plurality of cells.

While wireless communication technology has been developed to LTE on the basis of wideband code division multiple access (WCDMA), demands and expectations of users and carriers steadily increase. Furthermore, technical evolution in wireless communication technology is required to have competitiveness since other wireless access techniques are being developed. That is, decrease in cost per bit, service availability increase, use of flexible frequency band, simple architecture and open interface, adequate power consumption of UEs, etc. are needed.

Recently, 3GPP has standardized technology subsequent to LTE. This is referred to as "LTE-A" in the specification. A main difference between LTE and LTE-A is a system bandwidth different and introduction of a relay. LTE-A aims to support a wideband of up to 100 MHz. To achieve this, LTE-A employs carrier aggregation or bandwidth aggregation that accomplishes a wideband using a plurality of frequency blocks. Carrier aggregation uses a plurality of frequency blocks as a large logical frequency band in order to achieve a wider frequency band. The bandwidth of each frequency block can be defined on the basis of a system block bandwidth used in LTE. Each frequency block is transmitted using a component carrier.

Figure 2:
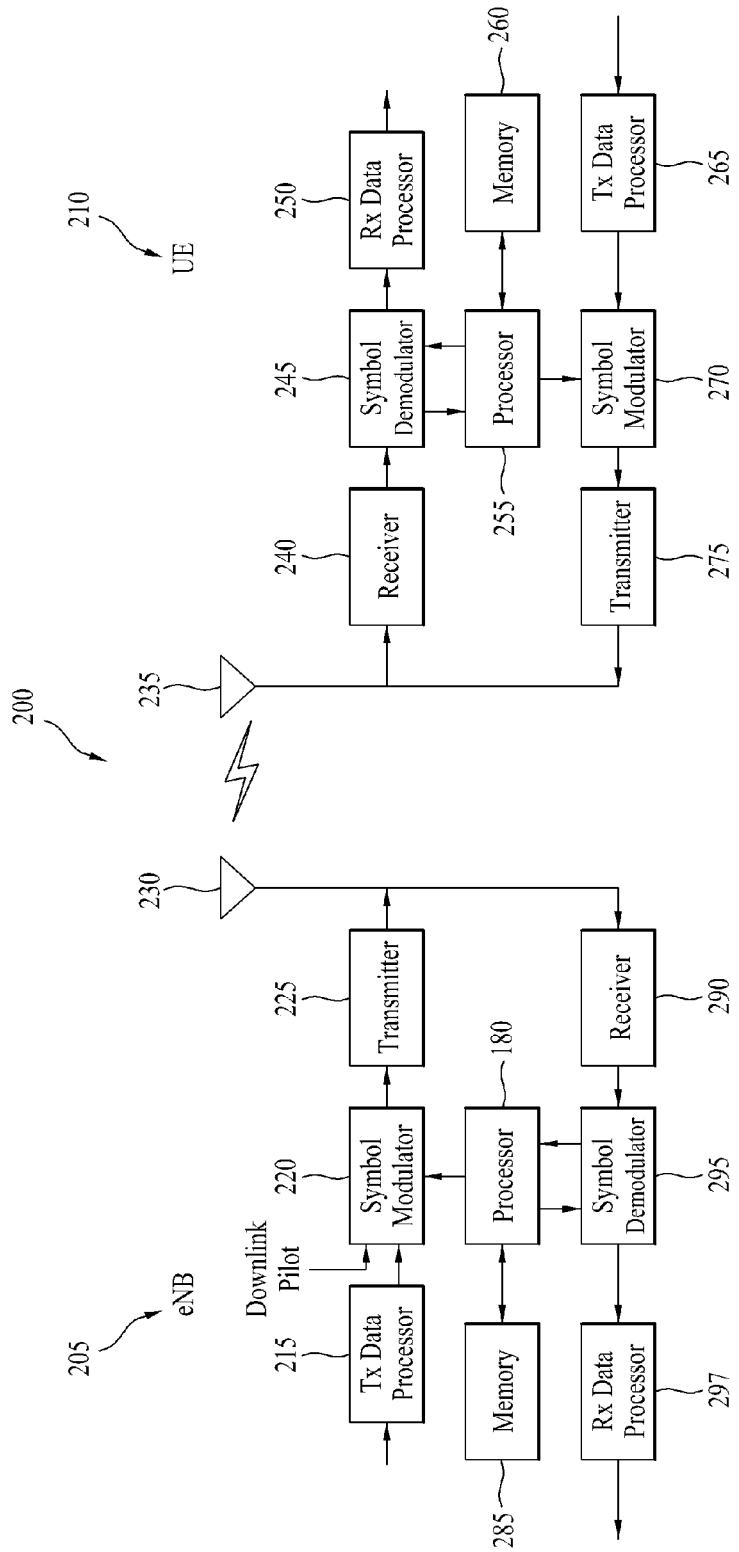
FIG. 2 is a block diagram illustrating configurations of a base station (BS) 105 and a UE 110 in a wireless communication system 100 according to the present invention.

FIG. 2 is a block diagram illustrating configurations of an eNB 105 and a UE 110 in a wireless communication system 100.

While one eNB 105 and one UE 110 are shown in FIG. 2 to simplify the configuration of the wireless communication system 100, the wireless communication system 100 may obviously include one or more eNBs and/or one or more UEs.

Referring to FIG. 2, the eNB 105 may include a transmission (Tx) data processor 115, a symbol modulator 120, a transmitter 125, a Tx/Rx antenna 130, a processor 180, a memory 185, a receiver 190, a symbol demodulator 195, and an Rx data processor 197. The UE 110 may include a Tx data processor 165, a symbol modulator 170, a transmitter 175, a Tx/Rx antenna 135, a processor 155, a memory 160, a receiver 140, a symbol demodulator 145, and an Rx data processor 150. While the antennas 130 and 135 are each shown as a single antenna in the eNB 105 and the UE 110, the eNB 105 and the UE 110 include multiple antennas. Hence, the eNB 105 and the UE 110 support MIMO (Multiple Input Multiple Output). Furthermore, the eNB 105 may support both single user-MIMO (SU-MIMO) and multi-user-MIMO (MU-MIMO) in the present invention.

On the downlink, the Tx data processor 115 receives traffic data, processes the received traffic data through formatting, coding, interleaving, and modulation (or symbol mapping), and thus outputs modulated symbols ("data symbols"). The symbol modulator 120 processes the data symbols received from the Tx data processor 115 and pilot symbols, thus producing a symbol stream.

More specifically, the symbol modulator 120 multiplexes the data symbols and the pilot symbols and transmits the multiplexed symbols to the transmitter 125. Each transmission symbol may be a data symbol, a pilot symbol or a zero signal value. Pilot symbols may be transmitted successively during each symbol period. The pilot symbols may be frequency division multiplexing (FDM) symbols, orthogonal frequency division multiplexing (OFDM) symbols, time division multiplexing (TDM) symbols, or code division multiplexing (CDM) symbols.

The transmitter 125 converts the symbol stream into one or more analog signals and generates a downlink signal suitable for transmission on a radio channel by additionally processing the analog signals (e.g. amplification, filtering, and frequency upconversion). The downlink signal is transmitted to the UE 110 through the antenna 130.

The UE 110 receives the downlink signal from the eNB 105 through the antenna 135 and provides the received downlink signal to the receiver 140. The receiver 140 processes the downlink signal, for example, through filtering, amplification and frequency downconversion and converts the processed downlink signal into digital samples. The symbol demodulator 145 demodulates received pilot symbols and outputs the demodulated pilot symbols to the processor 155 for use in channel estimation.

The symbol demodulator 145 receives a frequency response estimate with respect to downlink from the processor 155, acquires data symbol estimates (i.e. estimates of the transmitted data symbols) by demodulating the received data symbols using the frequency response estimate and provides the data symbol estimates to the Rx data processor 150. The Rx data processor 150 demodulates the data symbol estimates (i.e. performs symbol demapping), deinterleaves the demodulated data symbols, and decodes the deinterleaved data symbols, thereby recovering the traffic data transmitted by the eNB 105.

The operations of the symbol demodulator 145 and the Rx data processor 150 are complementary to the operations of the symbol modulator 120 and the Tx data processor 115 of the eNB 105.

On the uplink, in the UE 110, the Tx data processor 165 outputs data symbols by processing received traffic data. The symbol modulator 170 multiplexes the data symbols received from the Tx data processor 165 with pilot symbols, modulates the multiplexed symbols, and outputs a stream of the symbols to the transmitter 175. The transmitter 175 generates an uplink signal by processing the symbol stream and transmits the uplink signal to the eNB 105 through the antenna 135.

The eNB 105 receives the uplink signal from the UE 110 through the antenna 130. In eNB BS 105, the receiver 190 acquires digital samples by processing the uplink signal. The symbol demodulator 195 provides uplink pilot symbol estimates and uplink data symbol estimates by processing the digital samples. The Rx data processor 197 processes the data symbol estimates, thereby recovering the traffic data transmitted by the UE 110.

The processors 155 and 180 control, adjust and manage operations of the UE 110 and the eNB 105. The processors 155 and 180 may be connected respectively to the memories 160 and 185 that store program code and data. The memories 160 and 185 store an operating system, applications, and general files, in connection with the processors 155 and 180.

The processors 155 and 180 may also be called controllers, microcontrollers, microprocessors, or microcomputers. The processors 155 and 180 may be configured in hardware, firmware, software, or a combination thereof. When embodiments of the present invention are implemented using hardware, application specific integrated circuits (ASICs), digital signal processors (DSPs), digital signal processing devices (DSPDs), programmable logic devices (PLDs), or field programmable gate arrays (FPGAs) which are adapted to implement the present invention may be included in the processors 155 and 180. When the embodiments of the present invention are implemented using firmware or software, the firmware or software may be configured to include a module, a procedure, a function, etc. which performs functions or operations according to the present invention. The firmware or software may be included in the processors 155 and 180, or stored in the memories 160 and 185 and invoked from the memories 160 and 185 by the processors 155 and 180.

The layers of radio interface protocols between a UE/BS and a network may be classified into Layers 1, 2 and 3 (L1, L2 and L3) based on the three lowest layers of the open system interconnection (OSI) model. A physical layer corresponds to L1 and provides an information transmission service on physical channels. A radio resource control (RRC) layer corresponds to L3 and provides radio control resources between the UE and the network. The UE/eNB and the network exchange RRC messages through the RRC layer.

The term eNB used in the present invention can refer to a "cell or sector" when used as a regional concept. A serving eNB (or serving cell) can be regarded as an eNB which provides main services to UEs and can transmit and receive control information at a coordinated multiple transmission point. In this sense, the serving eNB (or serving cell) can be referred to as an anchor eNB (or anchor cell). Similarly, a neighbor eNB can be referred to as a neighbor cell.

Codebook Based Precoding Scheme

To support MIMO transmission, precoding for appropriately distributing transmission information to antennas according to channel state can be applied. Codebook based precoding refers to a scheme in which a transmitting side and a receiving side predetermine a set of precoding matrices, the receiving side (e.g. UE) measures channel information from the transmitting side (e.g. eNB) and feeds back information on a most suitable precoding matrix (i.e. precoding matrix index (PMI)) to the transmitting side and the transmitting side applies appropriate precoding to signal transmission.

Since the codebook based precoding scheme selects an appropriate matrix from the predetermined set of precoding matrices, feedback overhead can be reduced compared to explicit feedback of optimal precoding information to actual channel information although optimal precoding is not applied all the time.

Figure 3:
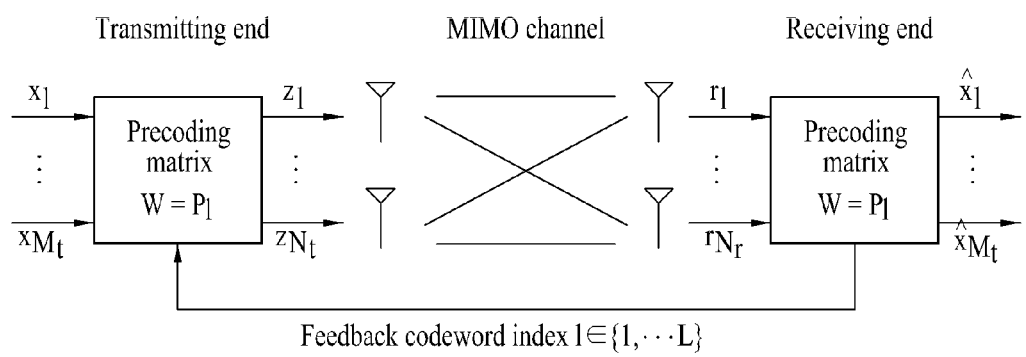
FIG. 3 illustrates the basic concept of codebook based precoding.

FIG. 3 illustrates the basic concept of codebook based precoding.

According to the codebook based precoding scheme, the transmitting side and the receiving side share codebook information including a predetermined number of precoding matrices which are predetermined based on transmission rank, number of antennas, etc. That is, when feedback information is finite, a precoding based codebook scheme can be used. The receiving side can measure channel state through a received signal and feed back a finite number of pieces of preferred precoding matrix information (i.e. indices of corresponding precoding matrices) to the transmitting side on the basis of the aforementioned codebook information. For example, the receiving side can measure a received signal using ML (Maximum Likelihood) or MMSE (Minimum Mean Square Error) and select an optimal precoding matrix. While FIG. 3 shows that the receiving side transmits precoding matrix information per codeword to the transmitting side, the present invention is not limited thereto.

Upon reception of feedback information from the receiving side, the transmitting side can select a specific precoding matrix from the codebook based on the received information. The transmitting side can perform precoding by multiplying layer signals corresponding to a transmission rank by the selected precoding matrix and transmit precoded transmission signals to the receiving side through a plurality of antennas. In a precoding matrix, the number of rows equals the number of antennas and the number of columns equals the number of layers. For example, when the number of Tx antennas is 4 and the number of transport layers is 2, a 4×2 matrix can be configured as a precoding matrix. Information transmitted through each layer can be mapped to each antenna through the precoding matrix.

Upon reception of the precoded signals transmitted from the transmitting side, the receiving side can perform inverse processing of precoding performed by the transmitting side on the received signals to recover the received signals. Since a precoding matrix satisfies unitary matrix (U) conditions such as $U \ast U^H = I$, inverse processing of precoding can be performed in such a manner that the received signals are multiplied by a Hermitian matrix $P^H$ of the precoding matrix P used for precoding of the transmitting side.

Table 1 shows a codebook used for downlink transmission using 2 Tx antennas in 3GPP LTE Release-8/9 and Table 2 shows a codebook used for downlink transmission using 4 Tx antennas in 3GPP LTE Release-8/9.

TABLE 1

| Codebook index | Number of rank 1 | Number of rank 2 |
|---|---|---|
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

TABLE 2

| Codebook index | $u_n$ | Number of layers v: 2 | 3 | 4 |
|---|---|---|---|---|
| 0 | $u_0 = [1\ -1\ -1\ -1]^T$ | $W_0^{\{14\}}/\sqrt{2}$ | $W_0^{\{124\}}/\sqrt{2}$ | $W_0^{\{1234\}}/2$ |
| 1 | $u_1 = [1\ -j\ 1\ j]^T$ | $W_1^{\{12\}}/\sqrt{2}$ | $W_1^{\{123\}}/\sqrt{2}$ | $W_1^{\{1234\}}/2$ |
| 2 | $u_2 = [1\ 1\ -1\ 1]^T$ | $W_2^{\{12\}}/\sqrt{2}$ | $W_2^{\{123\}}/\sqrt{2}$ | $W_2^{\{3214\}}/2$ |
| 3 | $u_3 = [1\ j\ 1\ -j]^T$ | $W_3^{\{12\}}/\sqrt{2}$ | $W_3^{\{123\}}/\sqrt{2}$ | $W_3^{\{3214\}}/2$ |
| 4 | $u_4 = [1\ (-1-j)/\sqrt{2}\ -j\ (1-j)/\sqrt{2}]^T$ | $W_4^{\{14\}}/\sqrt{2}$ | $W_4^{\{124\}}/\sqrt{2}$ | $W_4^{\{1234\}}/2$ |
| 5 | $u_5 = [1\ (1-j)/\sqrt{2}\ j\ (-1-j)/\sqrt{2}]^T$ | $W_5^{\{14\}}/\sqrt{2}$ | $W_5^{\{124\}}/\sqrt{2}$ | $W_5^{\{1234\}}/2$ |
| 6 | $u_6 = [1\ (1+j)/\sqrt{2}\ -j\ (-1+j)/\sqrt{2}]^T$ | $W_6^{\{13\}}/\sqrt{2}$ | $W_6^{\{134\}}/\sqrt{2}$ | $W_6^{\{1324\}}/2$ |
| 7 | $u_7 = [1\ (-1+j)/\sqrt{2}\ j\ (1+j)/\sqrt{2}]^T$ | $W_7^{\{13\}}/\sqrt{2}$ | $W_7^{\{134\}}/\sqrt{2}$ | $W_7^{\{1324\}}/2$ |
| 8 | $u_8 = [1\ -1\ 1\ 1]^T$ | $W_8^{\{12\}}/\sqrt{2}$ | $W_8^{\{124\}}/\sqrt{2}$ | $W_8^{\{1234\}}/2$ |
| 9 | $u_9 = [1\ -j\ -1\ -j]^T$ | $W_9^{\{14\}}/\sqrt{2}$ | $W_9^{\{134\}}/\sqrt{2}$ | $W_9^{\{1234\}}/2$ |
| 10 | $u_{10} = [1\ 1\ 1\ -1]^T$ | $W_{10}^{\{13\}}/\sqrt{2}$ | $W_{10}^{\{123\}}/\sqrt{2}$ | $W_{10}^{\{1324\}}/2$ |
| 11 | $u_{11} = [1\ j\ -1\ j]^T$ | $W_{11}^{\{13\}}/\sqrt{2}$ | $W_{11}^{\{134\}}/\sqrt{2}$ | $W_{11}^{\{1324\}}/2$ |
| 12 | $u_{12} = [1\ -1\ -1\ 1]^T$ | $W_{12}^{\{12\}}/\sqrt{2}$ | $W_{12}^{\{123\}}/\sqrt{2}$ | $W_{12}^{\{1234\}}/2$ |
| 13 | $u_{13} = [1\ -1\ 1\ -1]^T$ | $W_{13}^{\{13\}}/\sqrt{2}$ | $W_{13}^{\{123\}}/\sqrt{2}$ | $W_{13}^{\{1324\}}/2$ |
| 14 | $u_{14} = [1\ 1\ -1\ -1]^T$ | $W_{14}^{\{13\}}/\sqrt{2}$ | $W_{14}^{\{123\}}/\sqrt{2}$ | $W_{14}^{\{3214\}}/2$ |
| 15 | $u_{15} = [1\ 1\ 1\ 1]^T$ | $W_{15}^{\{12\}}/\sqrt{2}$ | $W_{15}^{\{123\}}/\sqrt{2}$ | $W_{15}^{\{1234\}}/2$ |

In Table 2, $W_n^{\{s\}}$ is obtained form a set $\{s\}$ configured from $W_n = I - 2u_n u_n^H / u_n^H u_n$. Here, I denotes a 4×4 unitary matrix and $u_n$ is a value obtained from Table 2.

As shown in Table 1, the codebook for 2 Tx antennas has a total of 7 precoding vectors/matrices. Here, since the unitary matrix is for an open-loop system, the number of precoding vectors/matrices for precoding of a closed-loop system becomes 6. The codebook for 4 Tx antennas, shown in Table 2, has a total or 64 precoding vectors/matrices.

The aforementioned codebook has common characteristics such as constant modulus (CM) characteristics, nested property, constrained alphabet, etc. According to CM characteristics, elements of all precoding matrices in the codebook do not include '0' and have the same size. According to the nested property, a precoding matrix of a low rank is composed of a subset of a specific column of a precoding matrix of a high rank. The constrained alphabet characteristic refers to a characteristic that alphabets of elements of all precoding matrices in the codebook are composed of $$\left\{ \pm 1, \pm j, \pm \frac{(1+j)}{\sqrt{2}}, \pm \frac{(-1+j)}{\sqrt{2}} \right\}.$$

Feedback Channel Structure

In FDD (Frequency Division Duplex) systems, an eNB cannot be aware of information on a downlink channel and thus channel information fed back by a UE is used for downlink transmission. In case of 3GPP LTE Release-8/9, a UE can feed back downlink channel information through a PUCCH or a PUSCH. The UE periodically feeds back channel information in the case of PUCCH and aperiodically feeds back the channel information at the request of the eNB in the case of PUSCH. In addition, channel information on an allocated frequency band (i.e. wideband (WB)) may be fed back or channel information on a specific number of RBs (i.e. subband (SB)) may be fed back.

Extended Antenna Configuration

Figure 4:
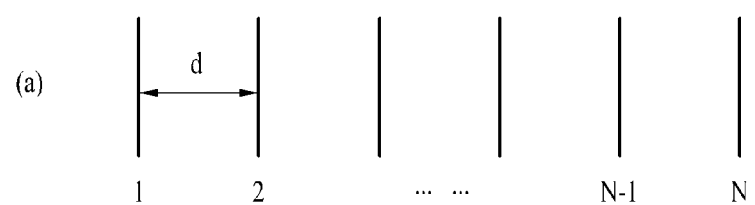
FIG. 4 illustrates exemplary 8-Tx antenna configurations.
Figure 4:
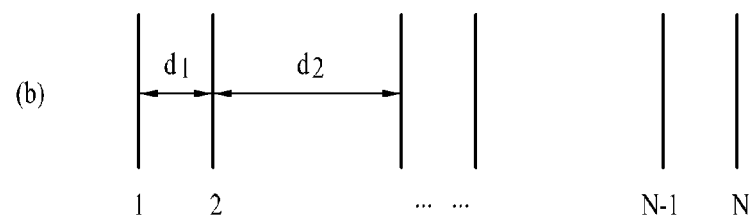
Figure 4:
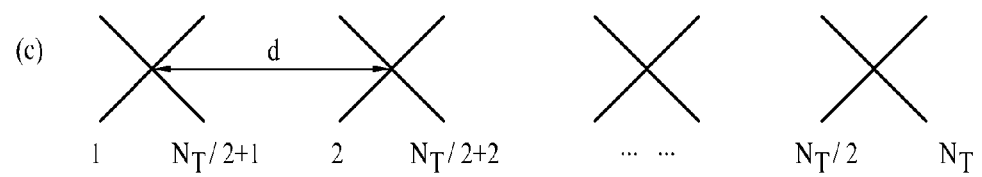

FIG. 4 illustrates exemplary 8-Tx antenna configurations.

FIG. 4(a) illustrates a case in which N antennas configure independent channels without being grouped, which is referred to as a uniform linear array (ULA). In this case, a space for a transmitter and/or a receiver may be insufficient to configure independent channels by spacing out a plurality of antennas.

FIG. 4(b) illustrates a paired ULA in which antennas are paired. In this case, a related channel can be configured for paired antennas and independent channels may be configured for different antenna pairs.

3GPP LTE Release-10 may use 8 Tx antennas on downlink, distinguished from 3GPP LTE Release-8/9 using 4 Tx antennas. To apply this extended antenna configuration, ULA antenna configurations as shown in FIGS. 4(a) and 4(b) may not be suitable since a plurality of Tx antennas needs to be installed in an insufficient space. Accordingly, a dual-pole (or cross-pole) antenna configuration as shown in FIG. 4(c) can be considered. In this case, antenna correlation can be reduced to enable data transmission with high throughput even if a distance d between antennas is short.

Codebook Structure

As described above, feedback overhead when a receiving side feeds back precoding information to be used for MIMO transmission from a transmitting side can be reduced by sharing a pre-defined codebook between the transmitting and the receiving side, achieving efficient precoding.

To configure a pre-defined codebook, a precoder matrix can be configured using a DFT (Discrete Fourier Transform) matrix or Walsh matrix. Otherwise, precoders in various forms can be configured according to combination with a phase shift matrix or phase shift diversity matrix.

In the case of co-polarization antenna, DFT based codebooks provide high performance. In configuration of a DFT matrix based codebook, an n×n DFT matrix can be defined as represented by Equation 1.

$$DFTn: D_n(k, \ell) = \frac{1}{\sqrt{n}} \exp(-j2\pi k\ell/n), \quad [\text{Equation 1}]$$

$$k, \ell = 0, 1, \ldots, n-1$$

In case of DFT matrix of Equation 1, only one matrix is present for a specific size n. Accordingly, it can be considered to additionally configure and use a rotated version of the DFTn matrix in order to define various precoding matrices and appropriately use the precoding matrices according to situation. Equation 2 represents an exemplary rotated DFTn matrix.

$$\text{rotated } DFTn: D_n^{(G,g)}(k, l) = \frac{1}{\sqrt{n}} \exp(-j2\pi k(l+g/G)/n), \quad [\text{Equation 2}]$$

$$k, l = 0, 1, \ldots, n-1,$$

$$g = 0, 1, \ldots, G.$$

When the DFT matrix is configured as represented by Equation 2, G rotated DFTn matrices can be generated and the generated matrices satisfy characteristics of the DFT matrix.

A description will be given of a Householder-based codebook structure. The Householder-based codebook structure refers to a codebook configured in a Householder matrix. The Householder matrix is used for Householder transform which is a linear transformation and can be used to perform QR decomposition. QR decomposition refers to decomposition of a matrix into an orthogonal matrix Q and an upper triangular matrix R. The upper triangular matrix refers to a square matrix in which elements below main diagonal entries are all 0. An exemplary 4×4 Householder matrix is represented by Equation 3.

$$M_1 = I_4 - 2u_0 u_1^H / \|u_0\|^2 \qquad [\text{Equation 3}]$$

$$= \frac{1}{\sqrt{4}} * \begin{bmatrix} 1 & 1 & 1 & 1 \\ 1 & 1 & -1 & -1 \\ 1 & -1 & 1 & -1 \\ 1 & -1 & -1 & 1 \end{bmatrix},$$

$$u_0^T = [1 \quad -1 \quad -1 \quad -1]$$

A 4×4 unitary matrix having CM characteristics can be generated according to Householder transform. A codebook can be configured such that an n×n precoding matrix is generated using Householder transform and a column subset of the generated precoding matrix is used as a precoding matrix for transmission at a rank less than n as the codebook for 4 Tx antennas as shown in Table 2.

Codebook for 8 Tx Antennas

In 3GPP LTE Release-10 having an extended antenna configuration (e.g. 8 Tx antennas), a feedback scheme used in 3GPP LTE Release-8/9 can be extended and applied. For example, channel state information (CIS) such as an RI (Rank Indicator), PMI (Precoding Matrix Index), CQI (Channel Quality Information), etc. can be fed back. A description will be given of a method for designing a dual precoder based feedback codebook which can be used in a system supporting an extended antenna configuration. In the dual precoder based feedback codebook, a receiving side can transmit a PMI to a transmitting side in order to indicate a precoder to be used for MIMO transmission of the transmitting side. A precoding matrix can be indicated by a combination of two different PMIs. That is, the receiving side feeds back two different PMIs (i.e. a first PMI and a second PMI) to the transmitting side and the transmitting side determines a precoding matrix indicated by a combination of the first and second PMIs and applies the precoding matrix for MIMO transmission.

In design of the dual precoder based feedback codebook, 8-Tx antenna MIMO transmission, support for single user-MIMO (SU-MIMO) and multiple user-MIMO (MU-MIMO), suitability of various antenna configurations, codebook design standards, codebook size, etc. can be considered.

A codebook applied to MIMO transmission using 8 Tx antennas can be designed such that the codebook supports only SU-MIMO in case of rank 2 or higher, is optimized for both SU-MIMO and MU-MIMO in case of rank 2 or less and is adapted to various antenna configurations.

For MU-MIMO, it is preferable to separate UEs participating in MU-MIMO in the correlation domain. Accordingly, a codebook for MU-MIMO needs to be designed to correctly operate on a channel having high correlation. Since DFT vectors provide high performance on a channel having high correlation, inclusion of a DFT vector in a set of codebooks of up to rank 2 can be considered. In addition, in a scattering propagation environment (e.g. indoor environment having lots of reflected waves) in which many spatial channels can be generated, SU-MIMO may be more suitable as a MIMO scheme. Accordingly, it can be considered that codebooks for ranks higher than rank-2 are designed such that the codebooks have high performance of separating multiple layers.

In design of a precoder for MIMO transmission, it is desirable that one precoder structure has high performance for various antenna configurations (low-correlation, high-correlation and cross-polarization antenna configurations). In arrangement of 8 Tx antennas, a cross-polarization array having an antenna spacing of 4λ may be configured as a low-correlation antenna configuration, a ULA having an antenna spacing of 0.5λ may be configured as a high-correlation antenna configuration, or a cross-polarization array having an antenna spacing of 0.5λ may be configured as a cross-polarization antenna configuration. A DFT based codebook structure can provide satisfactory performance for the high-correlation antenna configuration.

Block diagonal matrices may be more suitable for the cross-polarization antenna configuration. Accordingly, when a diagonal matrix is introduced to a codebook for 8 Tx antennas, a codebook providing high performance for all antenna configurations can be configured.

Codebook design standards need to satisfy a unitary codebook, CM characteristics, finite alphabet, appropriate codebook size, nested property, etc., as described above. The codebook design standards are applied to 3GPP LTE Release-8/9 codebook design. Application of the codebook design standards to 3GPP LTE Release-10 codebook design supporting extended antenna configurations can be considered.

To support advantages of using 8 Tx antennas in relation to codebook size, codebook size needs to increase. A large codebook (e.g. codebook of 4 bits or more for rank 1 and rank 2) may be needed to obtain a sufficient precoding gain from 8 Tx antennas in a low-correlation environment. A 4-bit codebook may be sufficient to obtain a precoding gain in a high-correlation environment. However, the codebook size for rank 1 and rank 2 can be increased in order to accomplish multiplexing gain of MU-MIMO.

A description will be given of finer beam granularity. The present invention proposes a feedback codebook structure for up to rank-2 transmission by modifying existing codebooks. This feedback codebook structure is referred to as a GoB (Grid-of-Beams) type feedback codebook structure. In the GoB type feedback codebook structure, a feedback precoder W can be represented by a product of two matrices as represented by Equation 4. The GoB type feedback codebook structure is proposed to support both a case in which antennas of a receiving side (e.g. UE) are co-polarized antennas and a case in which the antennas are cross-polarized antennas.

$$W = W_1 W_2 \quad \text{[Equation 4]}$$

Here, $W_1$ from among the two matrices constituting the feedback precoder W can be represented by Equation 5.

$$W_1 = \begin{bmatrix} \tilde{W}_1(n_1) & 0 \\ 0 & \varphi(n_1)\tilde{W}_1(n_2) \end{bmatrix} \quad \text{[Equation 5]}$$

Here, $n_1$ and $n_2$ may be the same value. However, when $n_1$ and $n_2$ are used for extension to cross-polarization antenna configuration in addition to co-polarized antenna configuration, $n_1$ and $n_2$ may have different values. When $n_1$ and $n_2$ have the same value, $\phi(n)$ is for co-polarized antenna setup for supporting the co-polarized antenna.

One of candidates for $N_t/2 \times 1$ ($N_t$ is the number of antennas) matrix $\tilde{W}_1(n)$ is an oversampled DFT matrix. Equation 6 represents the oversampled DFT matrix.

$$D_N^a = \frac{1}{\sqrt{N}} e^{j\frac{2\pi \cdot k \cdot n}{N \cdot a}}, \varphi(n) = e^{j\frac{2\pi \cdot N \cdot n}{N \cdot a}} \quad \text{[Equation 6]}$$

$$k = 0, \ldots, N-1, n = 0, \ldots, N \cdot a - 1, N = N_t/2$$

In Equation 6, 'a' represents an oversampling factor. As the oversampling factor 'a' increases, a DFT based precoding vector having finer granularity can be generated.

In the case of matrix $W_2$ from among the two matrices constituting the feedback precoder W of Equation 4, Release-8 downlink 2Tx codebook can be used. QPSK alphabet can be used for rank-1 and rank-2 codebooks and $W_2$ for rank-1 has two elements and can be represented by Equation 7. $W_2$ for rank-2 has four elements and can be represented by Equation 8.

$$\text{For rank-1: } W_2 = \frac{1}{\sqrt{2}} \begin{bmatrix} 1 \\ \alpha \end{bmatrix}, \alpha \in \{1, j, -1, -j\} \quad \text{[Equation 7]}$$

$$\text{For rank-2: } W_2 = \frac{1}{\sqrt{2}} \begin{bmatrix} 1 & 1 \\ \beta & -\beta \end{bmatrix}, \beta \in \{1, j\} \quad \text{[Equation 8]}$$

As described above, in the codebook based precoding scheme, the transmitting side and the receiving side predetermine a set of precoding matrices, the receiving side (e.g. UE) measures a channel through a signal received from the transmitting side (e.g. eNB) and feeds back information on a most suitable precoding matrix (e.g. precoding matrix index (PMI)) to the transmitting side and the transmitting side applies appropriate precoding to signal transmission on the basis of the PMI fed back thereto.

Since the method of using the feedback codebook structure as represented by Equation 4 selects an appropriate precoding matrix from a predetermined precoding matrix set, the method can reduce feedback overhead, compared to explicit feedback of optimal feedback information to actual channel information, although optimal precoding is not applied all the times.

The transmitting side and the receiving side can share the aforementioned codebook information (Equations 4 to 8) including a predetermined number of precoding matrices which are predetermined based on transmission rank, the number of antennas, etc. That is, when feedback information is finite, the precoding based codebook scheme can be used.

The receiving side (e.g. UE) can measure channel state through a signal received from the transmitting side (e.g. eNB) and feed back a finite number of pieces of preferred precoding matrix information (i.e. indices of corresponding precoding matrices) to the transmitting side on the basis of the aforementioned codebook information.

The receiving side (e.g. LTE-A UE) may have a cross-polarization antenna configuration or co-polarization antenna configuration. The receiving side can estimate a channel through a received signal and determine at least one of $n_1$ and $n_2$ that optimizes channel state through the estimated channel.

If the receiving side employs the co-polarization antenna configuration rather than the cross-polarization antenna configuration, $n_1$ and $n_2$ may have the same value. The receiving side can select at least one piece of precoding matrix information (e.g. precoding matrix index (PMI)) corresponding to the determined $n_1$ and $n_2$ by which channel state becomes optimal from a predefined precoding matrix set such as $$W_1 = \begin{bmatrix} \tilde{W}_1(n_1) & 0 \\ 0 & \varphi(n_1)\tilde{W}_1(n_2) \end{bmatrix}$$

represented by Equation 5.

The receiving side can feed back at least one selected precoding matrix index to the transmitting side as preferred precoding matrix information. Here, $n_1$ and/or $n_2$ are reported by the receiving side to the transmitting side as one index suitable for wideband. As described above, the receiving side can determine $n_1$ and/or $n_2$ through channel state estimated over wideband and feed back information on the precoding matrix index corresponding to $n_1$ and/or $n_2$ to the transmitting side.

Here, $n_1$ and/or $n_2$ may be determined through various methods. For example, arg max (HW) is obtained in Y=HW+n (H being a channel matrix, W being a feedback precoder matrix, n being noise) and $n_1$ and/or $n_2$ that maximize arg max (HW) are determined Here, determined or selected $n_1$ and/or $n_2$ may vary according to whether the receiving side employs a cross-polarization antenna or a co-polarization antenna.

After determination of $n_1$ and/or $n_2$, the receiving side can determine $\alpha$ or $\beta$ in the matrix $W_2$ on the basis of the determined $n_1$ and/or $n_2$. Specifically, the receiving side can determine $\alpha$ corresponding to $n_1$ and/or $n_2$ determined in Equation 7 (for rank-1:

$$W_2 = \frac{1}{\sqrt{2}}\begin{bmatrix} 1 \\ \alpha \end{bmatrix}, \alpha \in \{1, j, -1, -j\}$$

in case of rank 1 and determine $\beta$ corresponding to $n_1$ and/or $n_2$ determined in Equation 8 (for rank-2:

$$W_2 = \frac{1}{\sqrt{2}}\begin{bmatrix} 1 & 1 \\ \beta & -\beta \end{bmatrix}, \beta \in \{1, j\})$$

in case of rank 2. Here, the receiving side can determine $\alpha$ or $\beta$ suitable for subband and feed back precoding matrix information corresponding to the determined $\alpha$ or $\beta$ to the transmitting side.

A first precoding matrix index corresponding to the determined $n_1$ or $n_2$ and a second precoding matrix index corresponding to $\alpha$ or $\beta$ can be selected for different frequency granularities or selected with different time periods and transmitted. For example, frequency granularity corresponding to the first preceding matrix index is wideband and frequency granularity corresponding to the second preceding matrix index is subband. On the contrary, frequency granularity corresponding to the first preceding matrix index is subband and frequency granularity corresponding to the second preceding matrix index is wideband. In addition, the first precoding matrix index can be transmitted in a long term and the second precoding matrix index can be transmitted in a short term. Otherwise, the first precoding matrix index can be transmitted in a short term and the second precoding matrix index can be transmitted in a long term. The receiving side can simultaneously feed back the index (e.g. precoding matrix index) corresponding to a matrix or a vector selected from the matrix $W_1$ set and the index corresponding to a matrix or a vector selected from the matrix $W_2$.

Upon reception of precoding matrix index information on $W_1$ and $W_2$ as feedback information from the receiving side, the transmitting side can select a specific precoding matrix from the codebook on the basis of the received information. The transmitting side can perform precoding by multiplying as many layer signals as the transmission rank by the selected precoding matrix and transmit the precoded transmission signals to the receiving side through a plurality of antennas. In a precoding matrix, the number of rows equals the number of antennas and the number of columns equals the rank value. Since the rank value corresponds to the number of layers, the number of columns equals the number of layers. For example, when the number of Tx antennas is 4 and the number of transport layers is 2, a 4×2 precoding matrix can be generated. Information transmitted through each layer can be mapped to each antenna through the precoding matrix.

Upon reception of the precoded signals transmitted from the transmitting side, the receiving side can recover the received signals by performing inverse processing of precoding carried out by the transmitting side. Since a precoding matrix satisfies unitary matrix (U) conditions such as $U*U^H=I$, inverse processing of precoding can be performed in such a manner that the received signals are multiplied by Hermitian matrix $P^H$ of the precoding matrix P used for precoding of the transmitting side.

While the codebook structure proposed by the present invention when the receiving side employs the cross-polarization antenna or co-polarization antenna has been described, this is exemplary and the codebook structure proposed by the present invention is applicable to other antenna configurations.

While the aforementioned conventional codebook structures are suitable for a case in which the co-polarization antenna configuration is used, it is difficult to correctly feed back feedback information when the cross-polarization antenna configuration is employed. However, when the codebook structure proposed by the present invention is used, precoding matrix information which optimizes channel state can be appropriately calculated even when the receiving side employs the cross-polarization antenna configuration and the precoding matrix information can be fed back to the transmitting side, resulting in remarkable improvement of communication performance between the transmitting side and the receiving side.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The invention claimed is:

1. A method for feeding back, by a receiving side, codebook based precoding matrix information in a wireless communication system, the method comprising:
   estimating a channel through a signal received from a transmitting side;
   selecting a first precoding matrix index and a second precoding matrix index indicating precoding matrices selected from a predefined codebook based upon the estimated channel; and
   transmitting the selected first and second precoding matrix indices to the transmitting side,
   wherein the predefined codebook supports a plurality of antenna patterns at the receiving side and a precoder W in the codebook is represented by the product of two precoding matrices $W_1$ and $W_2$,
   wherein $W_1$ is an oversampled discrete Fourier transform (DFT) matrix, is composed of a diagonal matrix and includes an element reflecting a factor according to an antenna pattern configuration of the receiving side,
   wherein $W_1$ is configured as $$W_1 = \begin{bmatrix} \tilde{W}_1(n_1) & 0 \\ 0 & \varphi(n_1)\tilde{W}_1(n_2) \end{bmatrix},$$

wherein $\tilde{W}_1(n)$ is an oversampled DFT matrix and $\varphi(n)$ is the factor according to the antenna pattern configuration of the receiving side, and wherein the first precoding matrix index indicates a precoding matrix selected from $W_1$ and the second precoding matrix index indicates a precoding matrix selected from $W_2$.

2. The method according to claim 1, wherein $W_2$ is configured in form of $$W_2 = \frac{1}{\sqrt{2}} \begin{bmatrix} 1 \\ \alpha \end{bmatrix}, \alpha \in \{1, j, -1, -j\} \text{ or}$$

$$W_2 = \frac{1}{\sqrt{2}} \begin{bmatrix} 1 & 1 \\ \beta & -\beta \end{bmatrix}, \beta \in \{1, j\}.$$

3. The method according to claim 1, wherein the matrix $\tilde{W}_1(n)$ is represented by $$D_N^a = \frac{1}{\sqrt{N}} e^{j\frac{2\pi \cdot k \cdot n}{N \cdot a}} \text{ and } \varphi(n) = e^{j\frac{2\pi \cdot N \cdot n}{N \cdot a}}$$

wherein k=0, ..., N−1, n=0, ..., N·a−1, N=$N_t$2, $N_t$ denotes the number of antennas and a denotes an oversampling factor.

4. The method according to claim 1, wherein the first precoding matrix index and the second precoding matrix index are selected for different frequency granularities or selected having different time periods and transmitted.

5. The method according to claim 4, wherein the frequency granularity of the first precoding matrix is wideband and the frequency granularity of the second precoding matrix is subband.

6. The method according to claim 4, wherein the frequency granularity of the first precoding matrix is subband and the frequency granularity of the second precoding matrix is wideband.

7. The method according to claim 1, wherein the receiving side is user equipment (UE) and the transmitting side is an eNB.

8. The method according to claim 4, wherein the selected first precoding matrix index is transmitted in a long term and the selected second precoding matrix index is transmitted in a short term.

9. The method according to claim 4, wherein the selected first precoding matrix index is transmitted in a short term and the selected second precoding matrix index is transmitted in a long term.

10. The method according to claim 1, wherein the selecting of the first precoding matrix index and the second precoding matrix index comprises:
   determining a value $n_1$ or $n_2$ by which the state of the channel becomes optimal and selecting the first precoding matrix index corresponding to the determined value $n_1$ or $n_2$ from $W_1$; and
   determining α or β according to transmission rank on the basis of the determined value $n_1$ or $n_2$ and selecting the second precoding matrix index corresponding to the determined α or β from $W_2$.

11. A receiving side for feeding back codebook based precoding matrix information in a wireless communication system, the receiving side comprising:
   a processor configured to estimate a channel through a signal received from a transmitting side and to select a first precoding matrix index and a second precoding matrix index indicating precoding matrices selected from a predefined codebook on the basis of the estimated channel; and a transmitter configured to transmit the selected first and second precoding matrix indices to the transmitting side, wherein the predefined codebook supports a plurality of antenna patterns at the receiving side and a precoder W in the codebook is represented by the product of two precoding matrices $W_1$ and $W_2$, wherein $W_1$ is an oversampled DFT matrix, is composed of a diagonal matrix and includes an element reflecting a factor according to an antenna pattern configuration of the receiving side, wherein $W_1$ is configured as $$W_1 = \begin{bmatrix} \tilde{W}_1(n_1) & 0 \\ 0 & \varphi(n_1)\tilde{W}_1(n_2) \end{bmatrix},$$

wherein $\tilde{W}_1(n)$ is an oversampled DFT matrix and $\phi(n)$ is the factor according to the antenna pattern configuration of the receiving side, and wherein the first precoding matrix index indicates a precoding matrix selected from $W_1$ and the second precoding matrix index indicates a precoding matrix selected from $W_2$.

12. The receiving side according to claim 11, wherein $W_2$ is configured in the form of $$W_2 = \frac{1}{\sqrt{2}}\begin{bmatrix} 1 \\ \alpha \end{bmatrix}, \alpha \in \{1, j, -1, -j\} \text{ or}$$

-continued $$W_2 = \frac{1}{\sqrt{2}}\begin{bmatrix} 1 & 1 \\ \beta & -\beta \end{bmatrix}, \beta \in \{1, j\}.$$

13. The receiving side according to claim 11, wherein the matrix $\tilde{W}_1(n)$ is represented by $$D_N^a = \frac{1}{\sqrt{N}} e^{j\frac{2\pi \cdot k \cdot n}{N \cdot a}} \text{ and } \varphi(n) = e^{j\frac{2\pi \cdot N \cdot n}{N \cdot a}}$$

wherein k=0, . . . , N−1, n=0, . . . , N·a−1, N=$N_t$/2, $N_t$ denotes the number of antennas and a denotes an oversampling factor.

14. The receiving side according to claim 11, wherein the first precoding matrix index and the second precoding matrix index are selected for different frequency granularities or selected having different time periods and transmitted.

15. The receiving side according to claim 11, wherein the receiving side is a UE and the transmitting side is an eNB.

16. The receiving side according to claim 11, wherein when the processor selects the first precoding matrix index and the second precoding matrix index, the processor is configured to determine a value $n_1$ or $n_2$ by which the state of the channel becomes optimal, to select the first precoding matrix index corresponding to the determined value $n_1$ or $n_2$ from $W_1$, to determine α or β according to transmission rank on the basis of the determined value $n_1$ or $n_2$ and to select the second precoding matrix index corresponding to the determined α or β from $W_2$.

* * * * *